ated Apr. 23, 1968

3,379,521
COMPACTION PROCESSES
John William Butcher, Newbury, England, assignor to United Kingdom Atomic Energy Authority, London, England
Filed Apr. 4, 1966, Ser. No. 539,859
Claims priority, application Great Britain, Apr. 14, 1965, 16,125/65
6 Claims. (Cl. 75—201)

ABSTRACT OF THE DISCLOSURE

High-density beryllium compacts are made by hot-pressing beryllium powder particles which have an inert non-metallic surface layer which constitutes a barrier to the formation of beryllium-beryllium metal bonds between the particles. According to the process, a valency imbalance is caused in said surface layer by applying to the powder particles an activator element having a stable valency different from that of beryllium and having an interatomic distance not greater than permits atoms of the element to displace atoms of the metal in the lattice of the film. The element is provided in a quantity sufficient to promote diffusion of the metal through the film at the sintering temperature of the beryllium powder but is insufficient to form a distinct phase with the beryllium in the film. According to the present invention, the process is improved by hot-pressing at a temperature of below 1100° C. which prevents significant grain growth of the beryllium.

This invention relates to compaction processes in which metallic entities, especially particles of a metallic powder, are sintered at elevated temperature to form a solid body of high density.

In copending application Ser. No. 400,652, filed Oct. 1, 1964, there is described and claimed a process for joining together beryllium entities by beryllium-beryllium metal bonds, said entities having an inert non-metallic surface layer which constitutes a barrier to the formation of said bonds, which process comprises producing a valency imbalance in said surface layer by incorporating therein added silicon in amount sufficient to promote diffusion of beryllium therethrough, said amount being below that which forms an individual compound or eutectic phase, and contacting the entities at a sintering temperature to bond them together and form a compact of high density.

In copending patent application Ser. No. 447,960, filed Apr. 14, 1965, there is described and claimed a process for joining metal entities by metal-metal bonds, said entities having on their surfaces an inert solid film which constitutes a barrier to the formation of said metal-metal bonds, which process comprises producing a valency imbalance in said solid film by incorporating therein an activator material having a bonding electron deficit or bonding electron surplus in the lattice of said film, the quantity of said material being less than that which forms a distinct phase in said surface film, and being sufficient to promote the diffusion of metal through said solid film at sintering temperature, and sintering said entities in the presence of said incorporated material.

The subject-matter of the aforementioned applications is also discussed in a paper by J. Butcher entitled "Activated Sintering of Beryllium" presented at the International Beryllium Conference held at the Centre d'Etudes Nucleaire, Grenoble, France, under the auspices of the Commissariat a l'Energie Atomique on May 17, 1965.

The present invention comprises sintering said metal entities under pressure in the presence of the said incorporated material which produces said valency imbalance, at a temperature at which there is no significant grain growth of the metal forming said entities.

In the case of beryllium, for example, a temperature below 1000° C. can be used. This is in contrast to normal sintering temperatures for beryllium which are above 1100° C. It is known that the higher the temperature the quicker the grain growth, and, moreover that the temperature at which significant grain growth sets in falls as the purity increases. Thus when using high-purity beryllium, which is desirable in order to reduce the tendency of fabricated beryllium compacts to fracture, the sintering temperature should be as low as possible.

Figure 1:
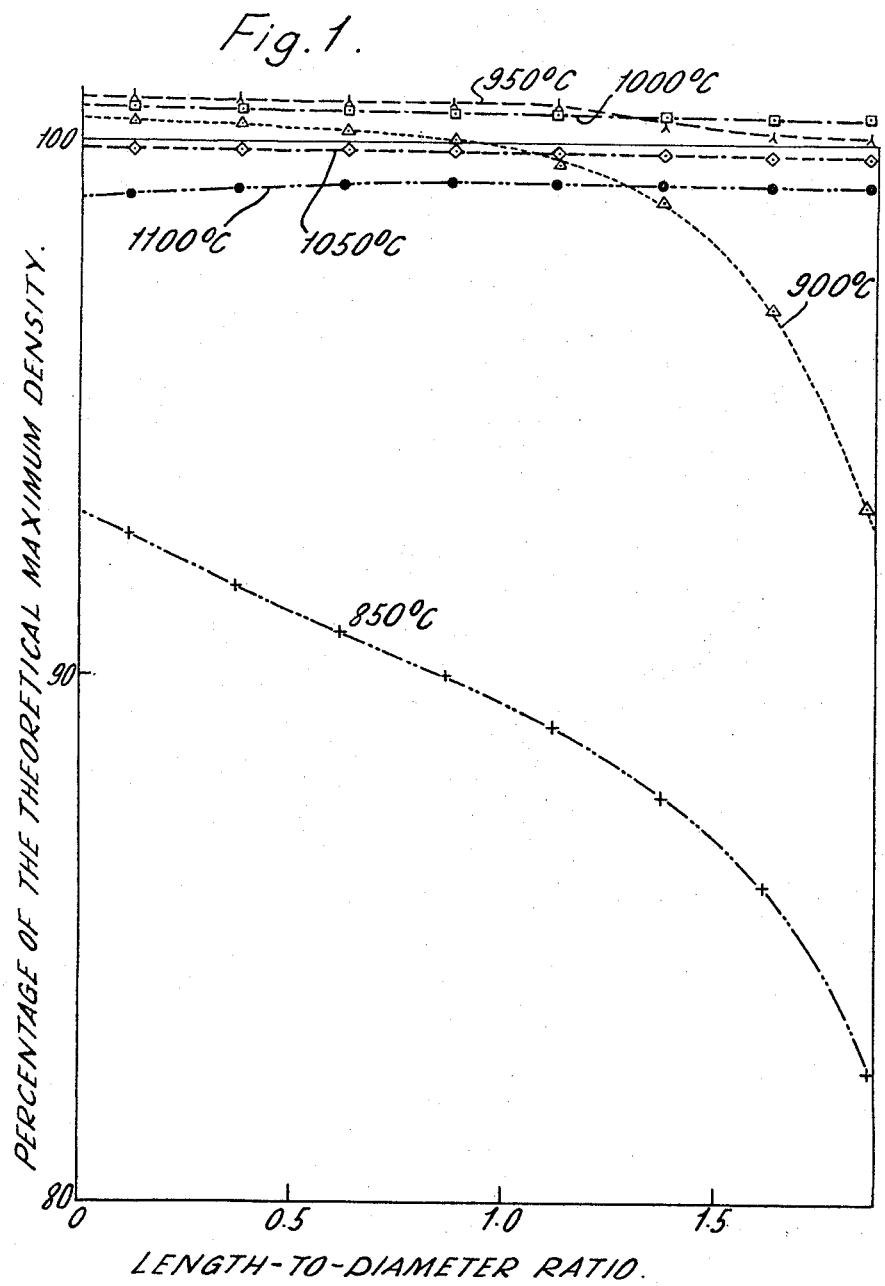

To enable the nature of the present invention to be more readily understood, attention is directed, by way of example, to the accompany drawings wherein FIGURE 1 shows graphs of the densities at different sintering temperatures of compacted beryllium powder activated with silicon.

Figure 2:
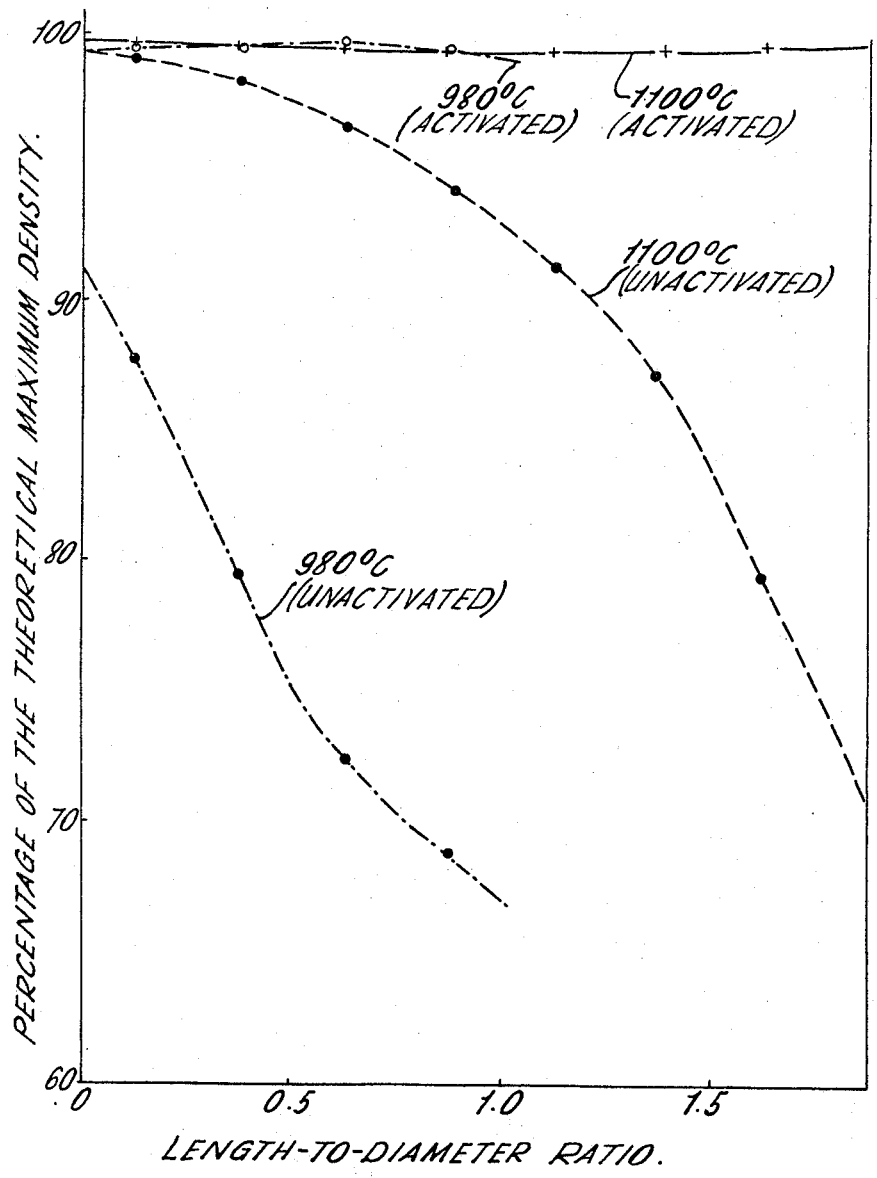

FIGURE 2 shows graphs, similar to FIGURE 1, using a finer beryllium powder of lower purity both unactivated and activated with silicon.

The beryllium powder used in the results illustrated by FIGURE 1 was prepared by producing a casting and producing swarf therefrom, powdering the swarf under argon atmosphere in a planetary ball mill employing beryllium-lined pots and tungsten carbide balls. After milling for 20 minutes the powder was sieved to yield batches of −200 mesh B.S., i.e. a particle size less than 76µ with an average size of 40–45µ. The batches were collected and divided into identical aliquots of weight 370 gms. The silicon added as activator, amounting to 1000 p.p.m., was spectroscopically pure and sieved to a particle size of −400 mesh B.S. Analysis of the −200 mesh powder prior to adding the silicon gave the following impurity content in p.p.m.: O, 4200; Mg. <15; Al, 240; Si, 40; Mn, <5; Cr, 30; Ni, <5; Cu, 65; C, 360; Fe, 300.

Compacts, 2 inches in diameter and 4 inches long, were prepared from the 370 gm. charges of the beryllium powder plus silicon, which were vibrated into graphite moulds and outgassed to <20 microns Hg at 550° C. in vacuum. The temperature was then raised, maintaining the vacuum, to 600° C., and thence to the hot-pressing (sintering) temperature while applying a pressure of 1 ton per square inch to the powder. The sintering temperature was held steady and the applied pressure maintained at 1 ton per square inch for 1 hour.

After sintering, the charge was allowed to cool, hammered out of the mould and machined to 1.8 inches diameter to remove carbon contamination. The longitudinal variation in density was determined from 0.4 inch thick slices taken from the compact.

In FIGURE 1, variation of density of the compact, taken as a percentage of the theoretical maximum (1.845 gm./cc.), is plotted against the distance of the slice from the end of the compact adjacent the plunger used to apply the pressure, divided by the compact diameter, for various sintering temperatures. It will be seen that a density of over 100% of theoretical was obtained with sintering temperatures of 900° C. and above. The microstructures of the compacts show evidence of grain growth commencing between 950° C. and 1000° C. by the crystals within the particles. Hitherto high-density beryllium compacts were unobtainable at sintering temperatures below about 1100° C., and at the higher temperatures normally used grain growth can be a problem.

The finer powder used to produce the results shown in FIGURE 2 had a particle size of less than 25µ and was produced by elutriating, in argon, −200 mesh powder produced by the method described above. The use of fine particles is advantageous in delaying fracture nucleation and propagation in forgings of the sintered compacts, provided that the potentially fine-grained structure can be preserved during the sintering process. Analysis of this sub-sieve powder gave the following impurity content, in p.p.m.: O, 7100; Mg, 50; Al, 480; Si, 500; Mn, 10; Cr, 20; Ni, 140; Cu, 90; C, 990; Fe, 245.

The silicon was added as the volatile liquid compound trichlorosilane, $SiHCl_3$, by adding the liquid to the beryllium powder in a polyethylene bottle and shaking vigorously. The quantity of liquid used corresponded to the addition of 500 p.p.m. of elemental silicon. Trichlorosilane decomposes at a comparatively low temperature and deposits silicon evenly on the beryllium particles in very fine form, allowing a smaller quantity of silicon to be used than is necessary when using elemental silicon. This is advantageous in reducing the impurity content of the final product and hence reducing its fracture tendency when forged.

The hot-pressing and test procedures were the same as for FIGURE 1, except that the 980° C. compacts were only 2 inches long.

The upper two curves in FIGURE 2 show that a reduction of the sintering temperature from 1100° C. to 980° C. had no significant effect on the density obtained. The lower two curves show for comparison the results obtained with similar beryllium powder but without the addition of silicon. The microstructures of the silicon-activated compacts show no evidence of grain growth at either 980° C. or 1100° C.

Fine beryllium powders with very low impurity content (as low as 0.2% BeO, corresponding to only 1300 p.p.m. of oxygen) are now becoming available, and in order to preserve the potential fine-grain properties of compacts produced from these powders, low sintering temperatures are essential. FIGURE 2 shows that even relatively impure fine-grained powder can be successfully sintered at as low as 980° C. by the addition of an activator, and this is not necessarily the lower limit.

I claim:
1. In a process for hot-pressing beryllium powder particles derived from cast beryllium into a high-density compact, said particles having an inert non-metallic surface layer which constitutes an unwanted barrier to the formation of beryllium-beryllium metal bonds between the particles, which process comprises producing a valency imbalance in said surface layer by applying to the powder particles an activator element having a stable valency different from that of beryllium and an inter-atomic distance not greater than permits atoms of said element to displace atoms of said metal in the lattice of the film, the quantity of said element being sufficient to promote diffusion of said metal through said film at the sintering temperature of the beryllium powder but insufficient to form a distinct phase with the beryllium in said film, and hot-pressing the particles to sinter them together, the improvement wherein the hot-pressing is performed at a temperature below 1100° C. which prevents significant grain growth of the beryllium.

2. A process as claimed in claim 1 wherein the activator element is silicon.

3. A process as claimed in claim 1 wherein the sintering temperature is less than 1000° C.

4. A process as claimed in claim 3 wherein the activator element is silicon.

5. A process as claimed in claim 4 wherein silicon is added to the beryllium powder as a volatile liquid silane.

6. A process as claimed in claim 5 wherein the volatile liquid silane is trichlorosilane.

No references cited.

BENJAMIN R. PADGETT, *Primary Examiner.*

CARL D. QUARFORTH, *Examiner.*

R. L. GRUDZIECKI, *Assistant Examiner.*